(12) United States Patent
Harrow

(10) Patent No.: US 10,188,217 B2
(45) Date of Patent: Jan. 29, 2019

(54) COLLAPSIBLE BED FOUNDATION

(71) Applicant: Jason Harrow, Los Angeles, CA (US)

(72) Inventor: Jason Harrow, Los Angeles, CA (US)

( * ) Notice: Subject to any disclaimer, the term of this patent is extended or adjusted under 35 U.S.C. 154(b) by 0 days.

(21) Appl. No.: 15/606,126

(22) Filed: May 26, 2017

(65) Prior Publication Data

US 2018/0092466 A1   Apr. 5, 2018

Related U.S. Application Data

(60) Provisional application No. 62/448,333, filed on Jan. 19, 2017, provisional application No. 62/404,263, filed on Oct. 5, 2016.

(51) Int. Cl.
| | |
|---|---|
| *A47C 19/00* | (2006.01) |
| *A47C 19/02* | (2006.01) |
| *A47C 19/22* | (2006.01) |
| *A47C 19/12* | (2006.01) |
| *F16B 12/54* | (2006.01) |

(52) U.S. Cl.
CPC .......... *A47C 19/005* (2013.01); *A47C 19/02* (2013.01); *A47C 19/027* (2013.01); *F16B 12/54* (2013.01)

(58) Field of Classification Search
CPC ... A47C 19/005; A47C 19/027; A47C 19/021; A47C 19/00; A47C 19/02; A47C 19/12; A47C 19/22; F16B 12/02; F16B 12/54
See application file for complete search history.

(56) References Cited

U.S. PATENT DOCUMENTS

| | | | | |
|---|---|---|---|---|
| 1,496,555 A | * | 6/1924 | Novitzky | F16B 12/60 5/295 |
| 3,683,429 A | * | 8/1972 | Mis | A47C 19/024 5/201 |
| 3,761,974 A | | 10/1973 | Kuss | |

(Continued)

FOREIGN PATENT DOCUMENTS

| | | |
|---|---|---|
| EP | 0192890 A3 | 9/1986 |
| WO | WO 2010015018 A1 | 2/2010 |

OTHER PUBLICATIONS

Printout of webpage at https://www.amazon.com/exec/obidos/ASIN/B008WO0XXK/ezvid02-20https://www.amazon.com/exec/obidos/ASIN/B008WO0XXK/ezvid02-20 on Aug. 12, 2016.

(Continued)

*Primary Examiner* — Nicholas F Polito
*Assistant Examiner* — Rahib T Zaman
(74) *Attorney, Agent, or Firm* — Joseph G. Swan, P.C.

(57) ABSTRACT

Provided is a mattress foundation that includes: a headboard end panel assembly, a footboard end panel assembly, a left side panel assembly, and a right side panel assembly, each having a first end and a second end. The first end of the left side panel assembly slidably engages with the first end of the headboard end panel assembly, thereby forming a first corner attachment. The second end of the left side panel assembly slidably engages with the first end of the footboard end panel assembly, thereby forming a second corner attachment. The first end of the right side panel assembly slidably engages with the second end of the headboard end panel assembly, thereby forming a third corner attachment. The second end of the right side panel assembly slidably engages with the second end of the footboard end panel assembly, thereby forming a fourth corner attachment.

20 Claims, 14 Drawing Sheets

(56) References Cited

U.S. PATENT DOCUMENTS

| | | | | |
|---|---|---|---|---|
| 3,768,106 | A * | 10/1973 | Fitzgerald | A47C 19/021 5/131 |
| 3,913,154 | A | 10/1975 | Sweeney | |
| 4,020,512 | A * | 5/1977 | Pringle | A47C 23/002 5/245 |
| 4,391,008 | A * | 7/1983 | Yamaoka | A47C 19/005 5/200.1 |
| 4,617,689 | A * | 10/1986 | Nelson | A47C 17/86 403/252 |
| 4,654,905 | A | 4/1987 | Miller | |
| 4,734,946 | A * | 4/1988 | Saputo | A47C 27/085 5/201 |
| 4,771,995 | A | 9/1988 | Wells et al. | |
| 4,788,727 | A | 12/1988 | Liu | |
| 5,070,556 | A * | 12/1991 | Gloger | A47C 17/86 16/35 R |
| 5,099,529 | A * | 3/1992 | Anderson | A47C 19/04 5/201 |
| 5,564,140 | A * | 10/1996 | Shoenhair | A47C 19/021 403/397 |
| 5,765,240 | A | 6/1998 | Workman | |
| 5,894,614 | A * | 4/1999 | Stroud | A47B 91/028 5/200.1 |
| 6,032,307 | A | 3/2000 | Workman | |
| 6,134,728 | A * | 10/2000 | Hernandez | A47C 19/025 5/176.1 |
| 7,003,822 | B1 * | 2/2006 | Sheehy | A47C 19/005 5/200.1 |
| 7,376,988 | B2 | 5/2008 | Wickstrom et al. | |
| 7,406,727 | B2 | 8/2008 | Wickstrom et al. | |
| 7,503,086 | B2 | 3/2009 | Wickstrom et al. | |
| 7,900,300 | B1 * | 3/2011 | Roberts | A47C 19/005 403/231 |
| 8,312,576 | B1 | 11/2012 | Oh | |
| 8,370,973 | B1 | 2/2013 | Oh | |
| 8,584,277 | B1 * | 11/2013 | Roberts | A47C 19/005 5/1 |
| 8,850,638 | B1 * | 10/2014 | Suh | A47C 19/12 5/176.1 |
| 9,080,304 | B1 | 7/2015 | Roberts et al. | |
| 2004/0055086 | A1 | 3/2004 | Owens, Jr. et al. | |
| 2005/0251911 | A1 | 11/2005 | Wickstrom et al. | |
| 2007/0044235 | A1 * | 3/2007 | Navarro | A47C 19/005 5/201 |
| 2007/0283501 | A1 | 12/2007 | Mossbeck | |
| 2008/0092289 | A1 * | 4/2008 | Smith | A47C 19/124 5/9.1 |
| 2014/0109313 | A1 * | 4/2014 | Rohr | A47C 19/02 5/282.1 |
| 2015/0096120 | A1 * | 4/2015 | Scarleski | A47C 31/105 5/484 |

OTHER PUBLICATIONS

Printout of webpage at http://www.costco.com/Sleep-Science-Queen-Folding-Mattress-Foundation.product.100004204.html on Aug. 12, 2016.
Printout of webpage at https://www.amazon.com/Master-BiFold-Folding-Mattress-Foundation/dp/B00X6HZ932 on Aug. 12, 2016.
Printout of webpage at http://www.walmart.com/ip/24628979?wmlspartner=wlpa&adid=22222222227017875282&wl0=&wl1=g&wl2=c&wl3=40845255992&wl4=pla-78658011152&wl5=9031507&wl6=&wl7=9031514&wl8=&wl9=pla&wl10=8175035&wl11=online&wl12=24628979&wl13=&veh=sem on Aug. 12, 2016.
Printout of webpage at http://www.furninfo.com/Furniture%20Industry%20News%20Archive/7054 on Aug. 12, 2016.
Printout of webpage at https://www.nestbedding.com/products/sturdy-folding-metal-foundation-box-spring?variant=874981525 on Aug. 12, 2016.

* cited by examiner

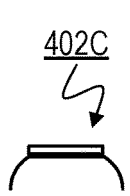
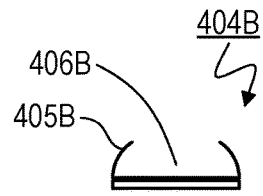
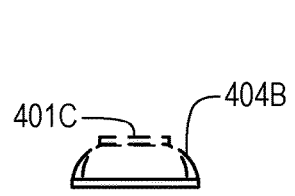
FIG. 12  FIG. 13  FIG. 14
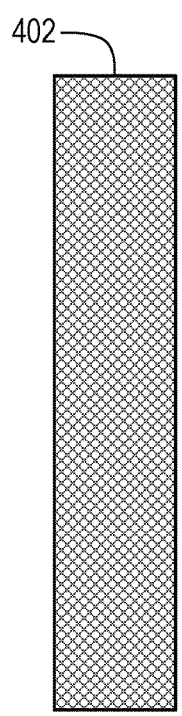
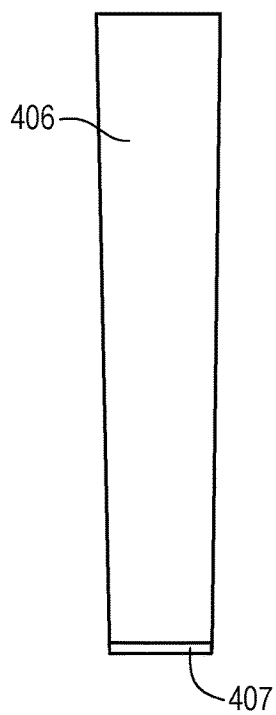
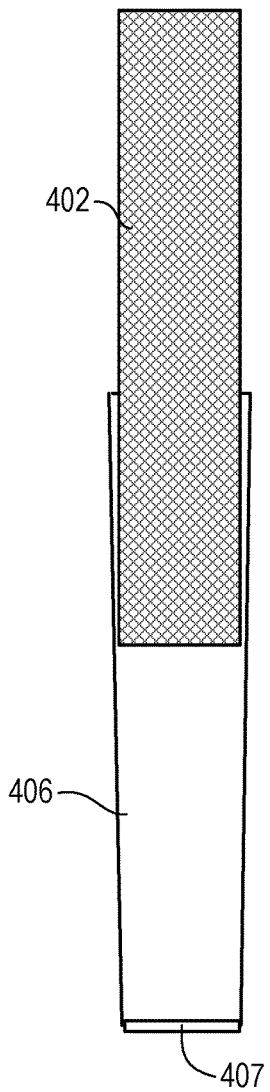
FIG. 15  FIG. 16  FIG. 17

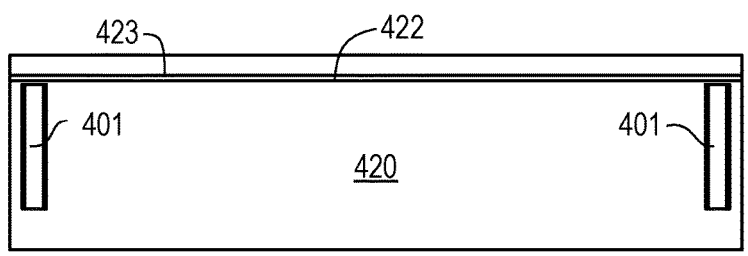 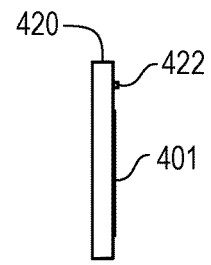
FIG. 18  FIG. 19
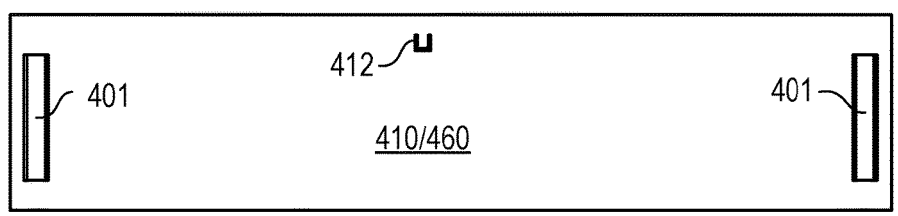
FIG. 20
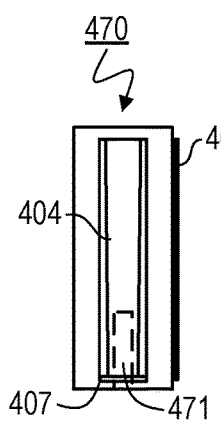 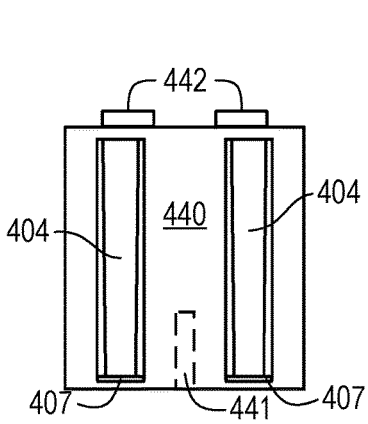 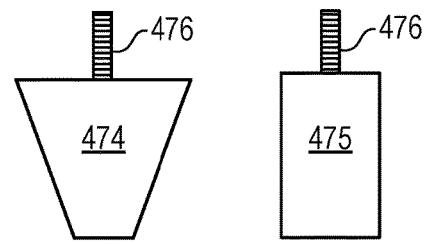 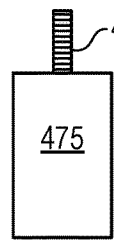
FIG. 21  FIG. 22  FIG. 23A  FIG. 23B
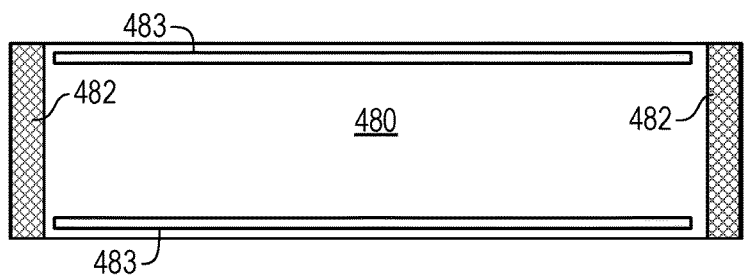
FIG. 24

COLLAPSIBLE BED FOUNDATION

This application claims the benefit of U.S. Provisional Patent Application Ser. No. 62/448,333, filed on Jan. 19, 2017 (the '333 application), and U.S. Provisional Patent Application Ser. No. 62/404,263, filed on Oct. 5, 2016 (the '263 application). The foregoing applications, collectively referred to herein as the "priority applications", are incorporated by reference herein as though set forth herein in full.

FIELD OF THE INVENTION

The present invention pertains, among other things, to foundations for beds and mattresses that can be easily collapsed for moving or storage and then easily set up (or assembled) for use.

BACKGROUND

A bed or mattress foundation, sometimes referred to as a box frame, underlies a bed's mattress, providing support for the mattress and preventing it from sagging. Such a foundation typically can be used to support any of a variety of different types of mattresses, such as memory foam, latex, innerspring or airbed mattresses. The foundation can be used with a bed frame underneath it, or in some cases legs, feet, gliders or the like are attached to it, and in such cases the foundation can be used without a separate bed frame.

One of the problems with most conventional foundations is that they are large and bulky, making them difficult to store and/or move (e.g., ship to a house and/or carry it to the desired room within a house). Several attempts have been made to provide a bed foundation that can be folded, collapsed or otherwise made smaller for transportation and/or storage. However, each such foundation has its own deficiencies, such as an inability to collapse the foundation down to a sufficiently small size, excessive difficulty in collapsing and/or setting up the foundation, etc.

SUMMARY OF THE INVENTION

The present invention addresses these issues by, among other things, providing mattress or bed foundations that can be easily collapsed down to a very small size and/or easily set up for use.

For instance, a foundation according to a first representative embodiment of the present invention preferably includes two end panel assemblies (one at the head of the foundation and one at its foot), a plurality of side panels and at least one crossmember support, each of which including a mechanism for slidably interconnecting with one or more of such other components (which includes a mating sliding mechanism).

A foundation according to a second representative embodiment of the present invention preferably includes: a headboard end panel assembly, a footboard end panel assembly, a left side panel assembly, and a right side panel assembly, each having a first end and a second end. The first end of the left side panel assembly slidably engages with the first end of the headboard end panel assembly, thereby forming a first corner attachment. The second end of the left side panel assembly slidably engages with the first end of the footboard end panel assembly, thereby forming a second corner attachment. The first end of the right side panel assembly slidably engages with the second end of the headboard end panel assembly, thereby forming a third corner attachment. The second end of the right side panel assembly slidably engages with the second end of the footboard end panel assembly, thereby forming a fourth corner attachment.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the accompanying drawings. However, it should be understood that the drawings merely depict certain representative and/or exemplary embodiments and features of the present invention and are not intended to limit the scope of the invention in any manner. The following is a brief description of each of the accompanying drawings.

FIG. 12 is a top cross-sectional view of a third embodiment of a component having an elongated tab which functions as one side of a sliding mechanism;

FIG. 13 is a top cross-sectional view of a component having an elongated slot which functions as the other side of a sliding mechanism according to the third embodiment;

FIG. 14 is a top cross-sectional view of the elongated tab and the elongated slot, according to the third embodiment, as engaged with each other;

FIG. 15 is a front cross-sectional view of an elongated tab according to the present invention;

FIG. 16 is a front cross-sectional view of an elongated tapered or wedge-shaped slot according to the present invention;

FIG. 17 is a front cross-sectional view of an elongated tab and an elongated slot, engaging with each other, with the tab partially inserted within the slot;

FIG. 18 is a front elevational view of the inner surface of a side panel assembly;

FIG. 19 is a right side elevational view of the inner surface of the side panel assembly;

FIG. 20 is a front elevational view of the inner surface of an end panel assembly;

FIG. 21 is a front elevational view of a corner piece;

FIG. 22 is a side elevational view of a crossmember assembly;

FIGS. 23A&B are front elevational views of two different versions of a leg/glider;

FIG. 24 is a front elevational view of the inner surface of a top panel;

DESCRIPTION OF THE PREFERRED EMBODIMENT(S)

Figure 1:
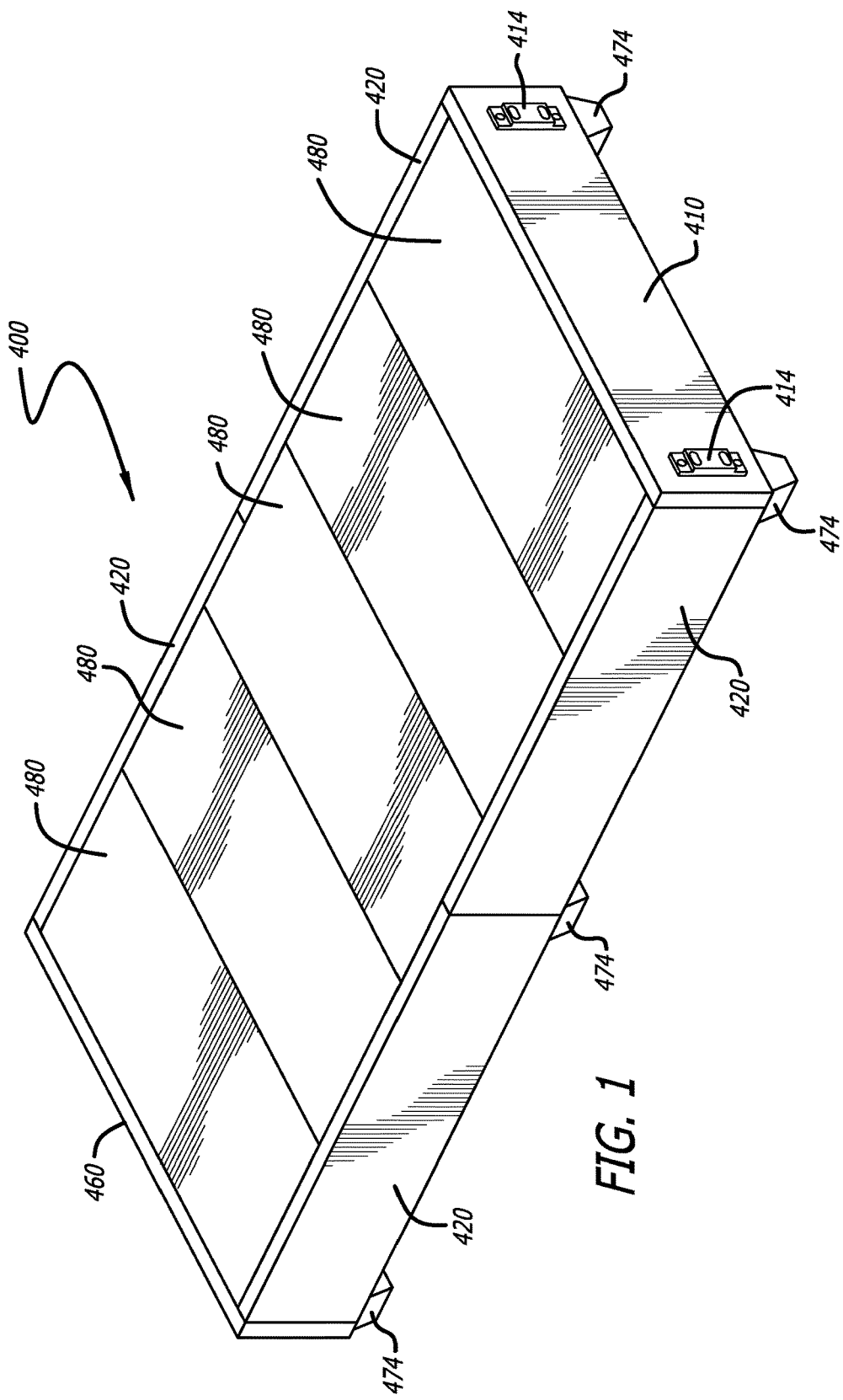
FIG. 1 is a perspective view of a fully assembled mattress foundation according to a representative embodiment of the present invention.

A collapsible bed foundation 400 according to a representative embodiment of the present invention is discussed in reference to the attached drawings. In the current embodiment, as shown in FIGS. 1 and/or 7, foundation 400 includes a headboard end panel assembly 410 (which optionally includes headboard brackets 414 on its outwardly facing surface), a plurality of side panel subassemblies 420, a crossmember assembly 440, a footboard end panel assembly 460 (which optionally includes footboard brackets, e.g., identical to headboard brackets 414, on its outwardly facing surface), a plurality of corner pieces 470, a plurality of feet, legs or gliders 474 (for convenience and without loss of generality, just referred to as legs 474 herein), and a plurality of top panel assemblies 480. Certain notable feature of the present embodiment are: (1) foundation 400 can be assembled very quickly and without using any tools or separate hardware, such as screws, bolts, washers or nuts; and (2) foundation 400 can be disassembled into relatively small components and, therefore, stored in a box with small dimensions.

Each of the headboard end panel assembly 410, side panel subassemblies 420, crossmember assembly 440, footboard end panel assembly 460, corner pieces 470 and top panel assemblies 480 preferably is primarily made of wood, with some additional hardware attached, as discussed in more detail below. For instance, the main structure of each of the headboard end panel assembly 410 (e.g., headboard panel 411), side panel subassemblies 420 (e.g., each side panel 421), footboard end panel assembly 460 (e.g., footboard end panel 461) and top panel assemblies 480 (e.g., each top panel 481) preferably is a rectangular panel that is made of wood, at least 1 inch thick (and, more preferably, at least 1.5 inches thick), at least 24 (and, more preferably, at least 30) inches long, and with mounting hardware (preferably made of steel or another metal) attached. However, in alternate embodiments, such panels 411, 421, 461 and 481 are made of polymer(s), composite(s) or other type(s) of materials, such as relatively strong but lightweight materials.

Figure 2:
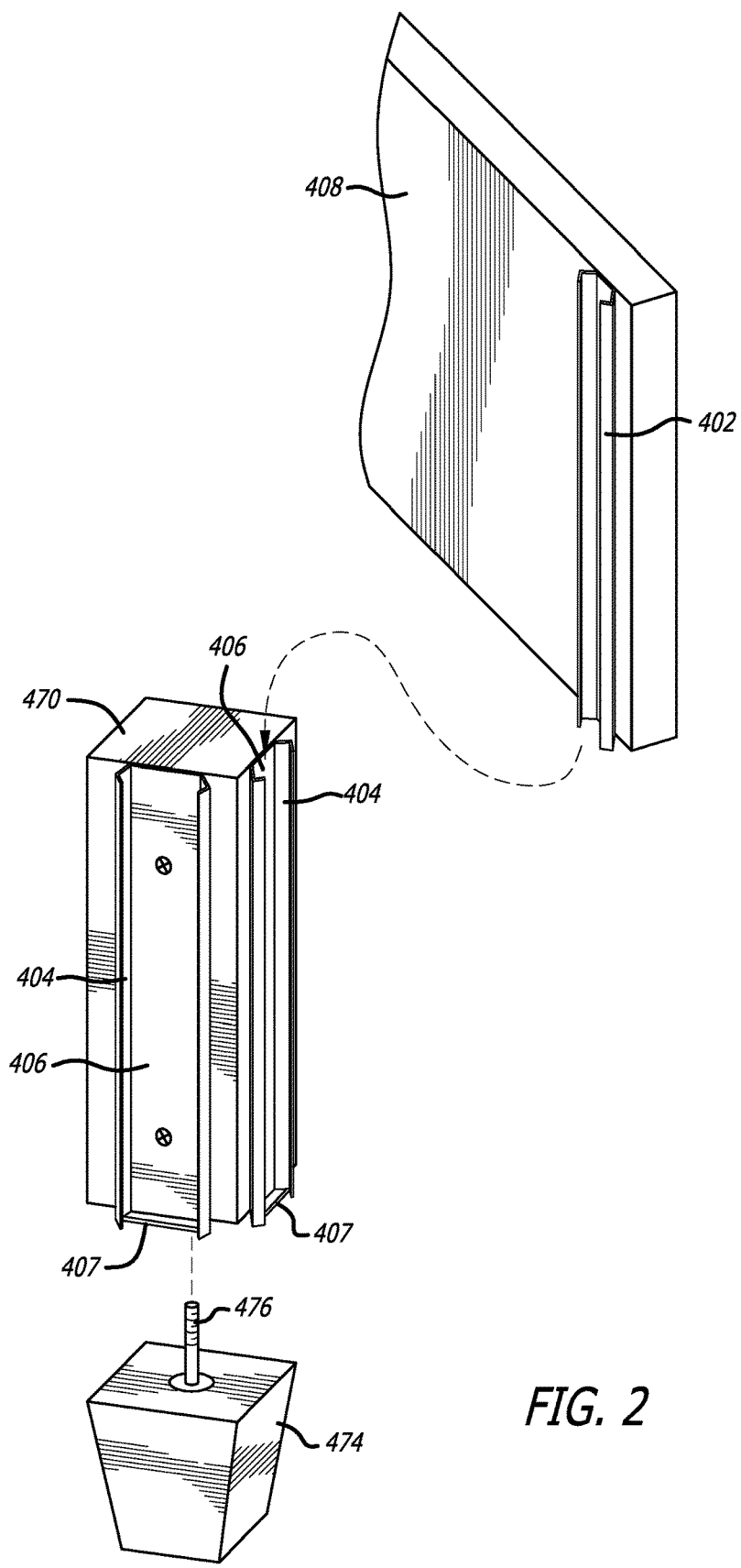
FIG. 2 is an exploded perspective view of a subassembly that includes a leg/glider, a corner piece, and portion of a panel with a sliding mechanism for attaching to one side of the corner piece.
Figure 3:
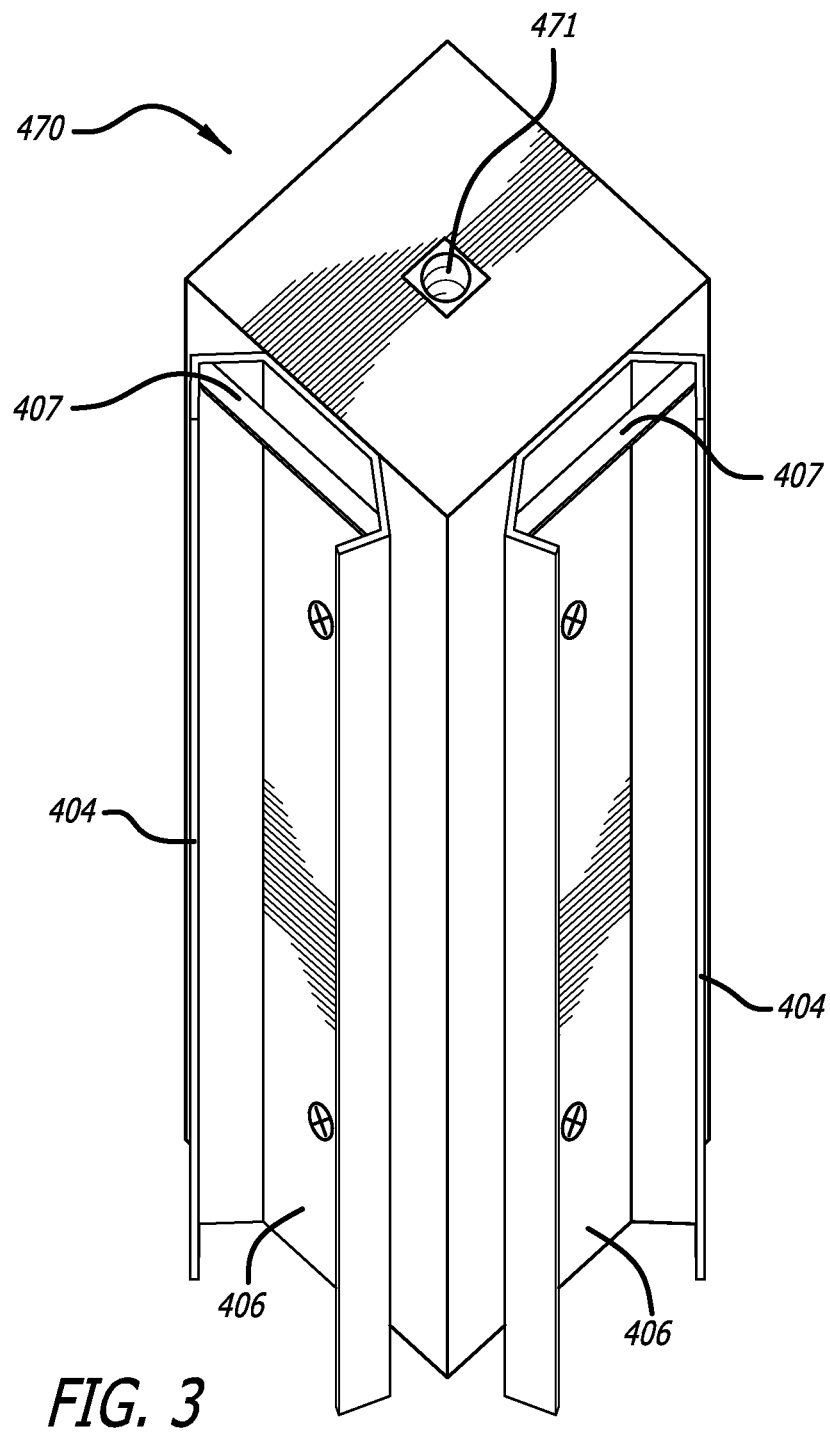
FIG. 3 is a bottom perspective view of a corner piece.

Preferably, in order to avoid any need for using tools or other attachment hardware (such as screws, bolts, nuts, washers, etc.), the various main components of foundation 400 simply slide together for assembly and then can be slid apart in order to disassemble the foundation 400 (e.g., for storage and/or transportation). An example of the preferred sliding mechanism is shown in FIG. 2, which illustrates how a corner piece 470 attaches to a panel 408 (which, e.g., could be a headboard end panel 411, a side panel 421 or a footboard end panel 461). In addition, FIGS. 2 and 3 show how a leg 474 attaches to the corner piece 470, by screwing its threaded post 476 into the threaded female threaded opening 471 in the bottom surface of corner piece 470. As shown in FIGS. 2 and 3, each of two adjacent sides of corner piece 470 includes an elongated sliding assembly 404, defining an elongated slot 406, into which a matching elongated protruding element or tab 402 can be inserted from the top of slot 406 and slid down until encountering stop 407 (at the bottom of slot 406). The other two sides of the corner piece 470 (generally not shown) can be open, e.g., in order to save weight and material, or can be provided with plain rectangular panels, e.g., for additional strength. In any event, for aesthetic purposes, the main structure of the entire corner piece 470 (as well as the main structure of each other main component, such as end panel assembly 410, side panel subassemblies 420, crossmember assembly 440, footboard end panel assembly 460 and top panel assemblies 480) preferably is covered in fabric material (e.g., black).

The sliding structure illustrated in FIG. 2 (i.e., with an elongated slot 406 on one component and an elongated protruding element or tab 402 on another component to which it attaches) preferably is used for attaching all of the major components of foundation 400. However, in alternate embodiments different structures are used. For instance, rather than an elongated protruding element or tab 402, a relatively small (e.g., circular) protruding element can be used in combination with a keyhole-shaped slot, as described and illustrated more fully in the priority applications.

Figure 4:
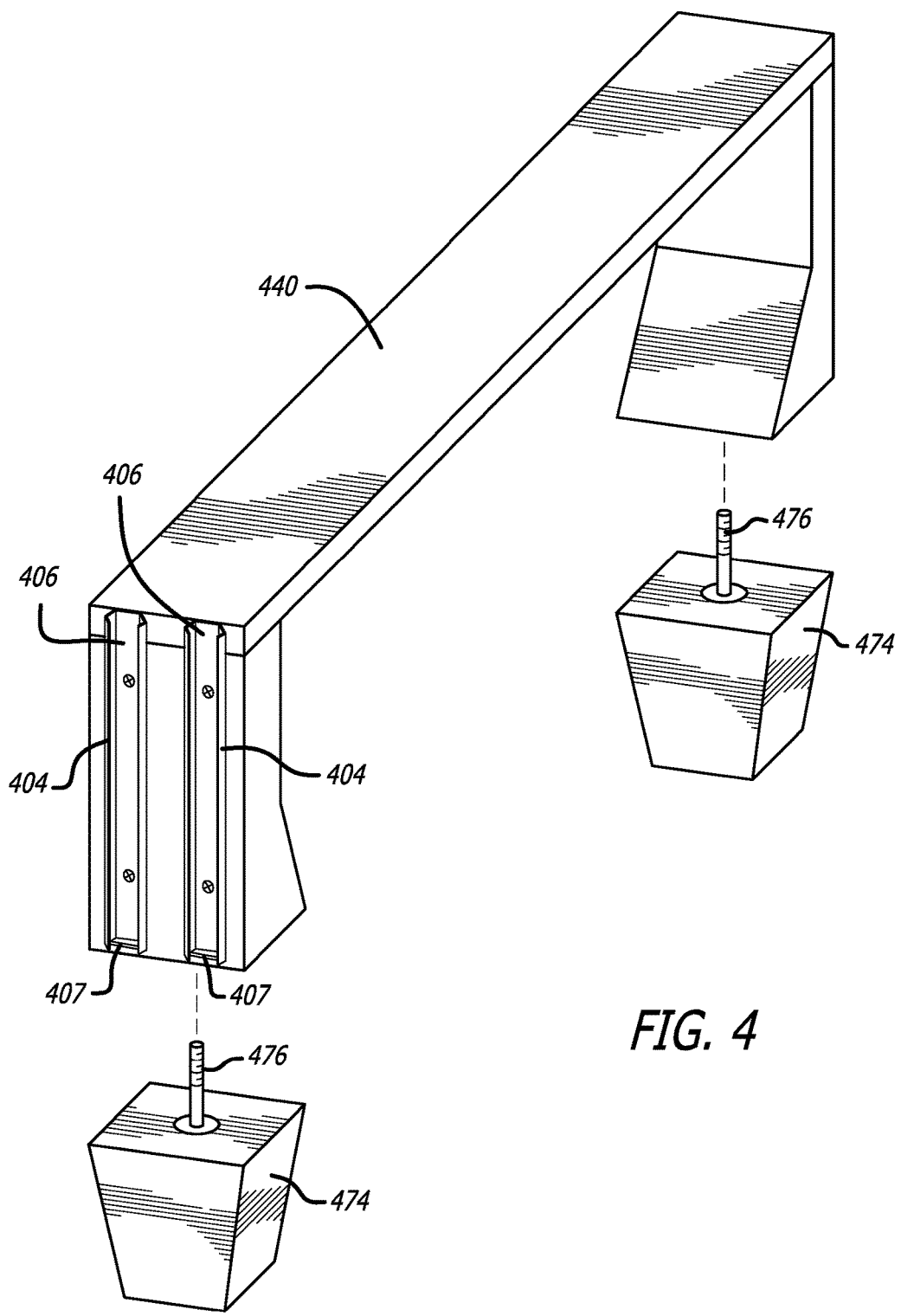
FIG. 4 is a perspective of a crossmember assembly.
Figure 5:
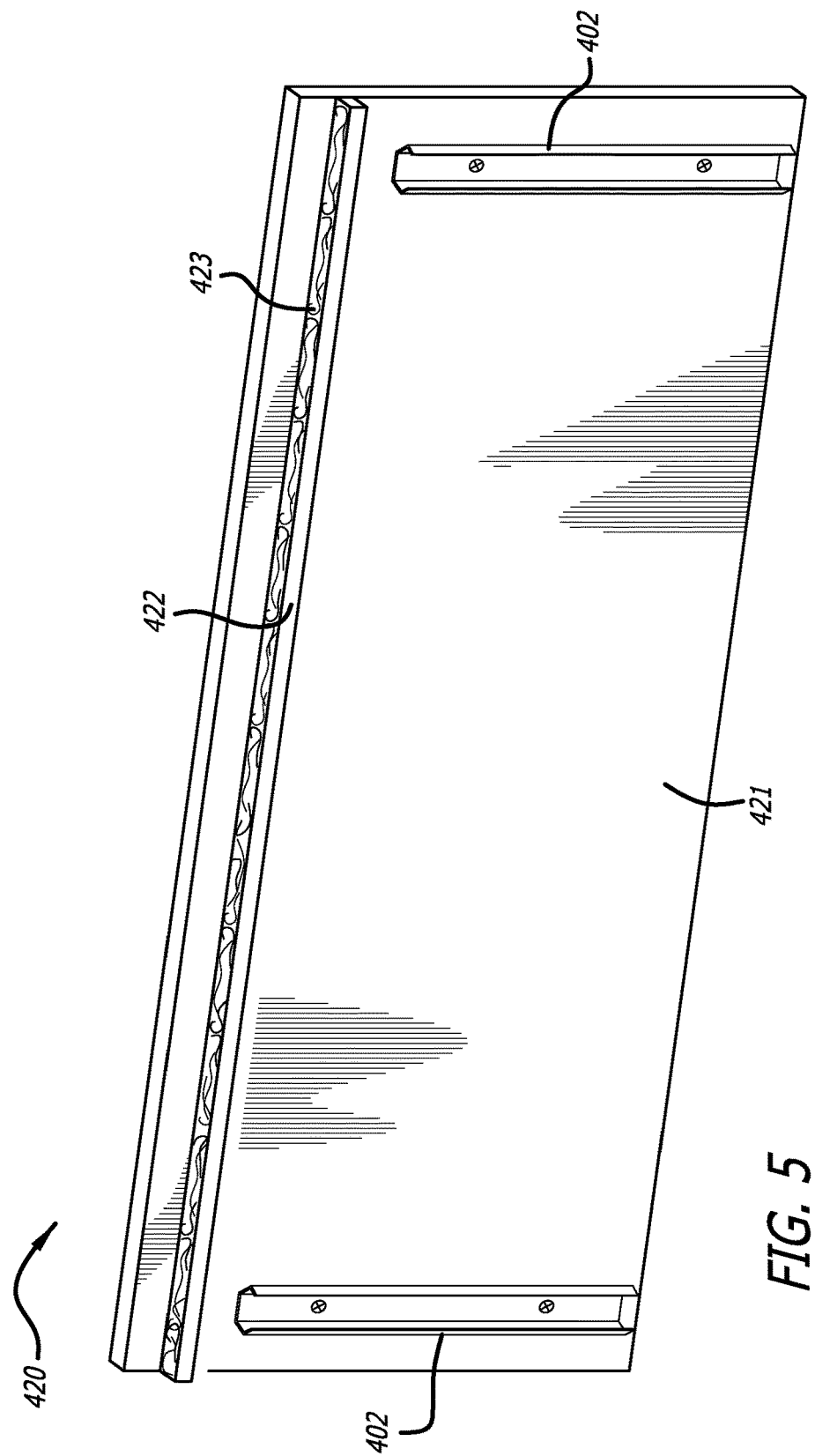
FIG. 5 is a perspective view of the inner surface of a side panel.

In the current embodiment, two side panel subassemblies 420 are attached together (as discussed below) to provide a side panel assembly, and a crossmember assembly 440 (e.g., as shown in FIG. 4) extends laterally between the left and right side panel assemblies (i.e., parallel to the headboard end panel assembly 410 and the footboard end panel assembly 460). More specifically, in the current embodiment, each of the left and right side panel assemblies of foundation 400 is comprised of two end-to-end side panel subassemblies 420, which are indirectly joined together by slidably attaching them to the same end of the crossmember assembly 440. As shown in FIG. 5, each such side panel subassembly 420 preferably includes a panel 421 (which forms its main structure), a ledge 422 (discussed in greater detail below) extending inwardly from the inner surface of panel 421, and an elongated protruding element or tab 402 on the inner surface of panel 421 at or near each end. As a result of this structure, when two such side panel subassemblies 420 are arranged end-to-end, their proximal ends collectively provide, in relatively close proximity, two parallel protruding elements or tabs 402.

As indicated in FIG. 4, each end of crossmember assembly 440 preferably includes two corresponding parallel elongated sliding assemblies 404 (defining corresponding elongated slots 406) with the same spacing (although only one end is shown in FIG. 4, the other end preferably is identical), so that each of the end-to-end side panel subassemblies 420 (on each side of the foundation 400) can be attached to the same end of the crossmember assembly 440 by simply sliding them together (i.e., by sliding the bottom end of each such protruding element 402 on the proximal end of a side panel subassembly 420 into the top end of one of the slots 406 provided at the end of the crossmember assembly 440). As a result, the two end-to-end side panel subassemblies 420 and the perpendicularly oriented crossmember assembly 440 are all attached together in a "T" configuration. As indicated in FIG. 22, on the bottom surface of the crossmember assembly 440, near each of its two ends, is a threaded female opening 441 (similar to opening 471) for accepting the threaded post 476 of one of the legs 474.

As shown in FIG. 4, in the current embodiment crossmember assembly 440 is comprised of a lateral crossmember beam, with a downwardly extending, perpendicularly oriented end section (which provides the sliding assemblies 404 and the threaded female openings 441) at each of its ends. However, in alternate embodiments (e.g., where additional strength is desired), crossmember assembly 440 can be provided as a single solid rectangular beam (e.g., with a solid structure between the downwardly extending, perpendicularly oriented end sections). In the current embodiment, the distal ends of the two end-to-end side panel subassemblies 420 attach (e.g., in a similar manner) to one side of a corner piece 470, with a headboard end panel assembly 410 or a footboard end panel assembly 460 attaching to an adjacent side of such corner piece 470 (e.g., so that such panels are at least approximately perpendicular to each other). In alternate embodiments, each corner piece 470 can be considered part of a subassembly 420, a headboard end panel assembly 410 or a footboard end panel assembly 460, or the side panel subassemblies 420 can otherwise attached directly to a headboard end panel assembly 410 or a footboard end panel assembly 460.

Figure 6:
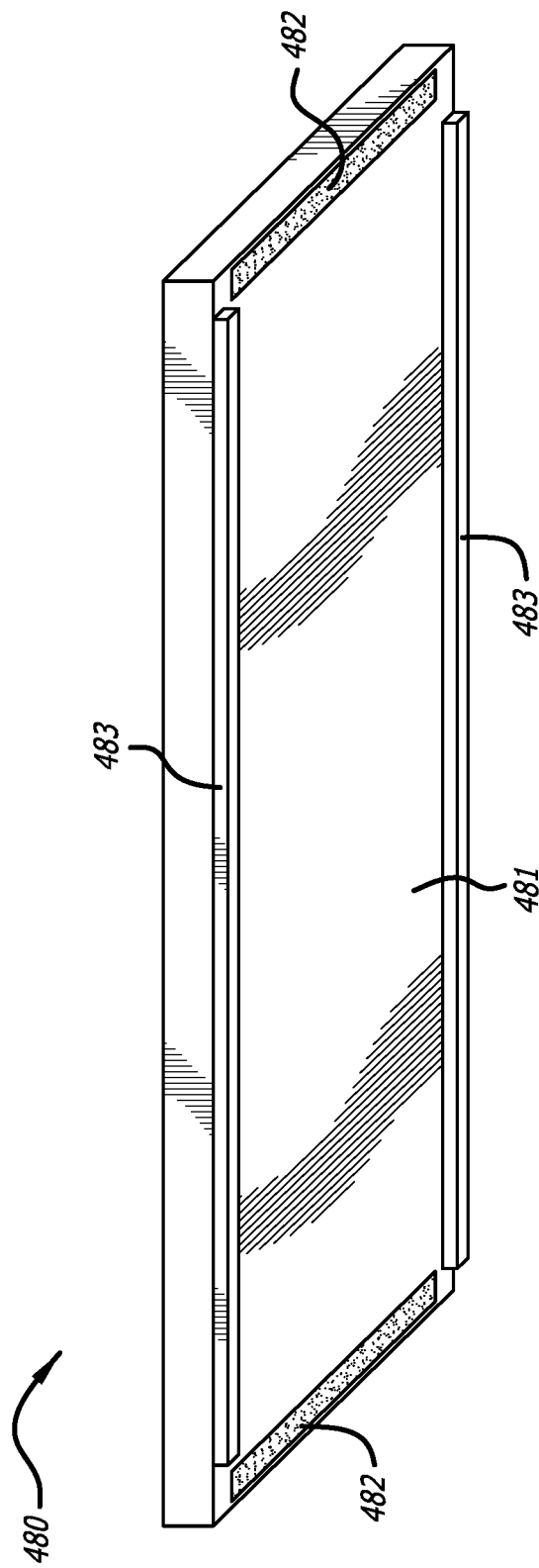
FIG. 6 is a perspective view showing the bottom surface of a top panel.
Figure 7:
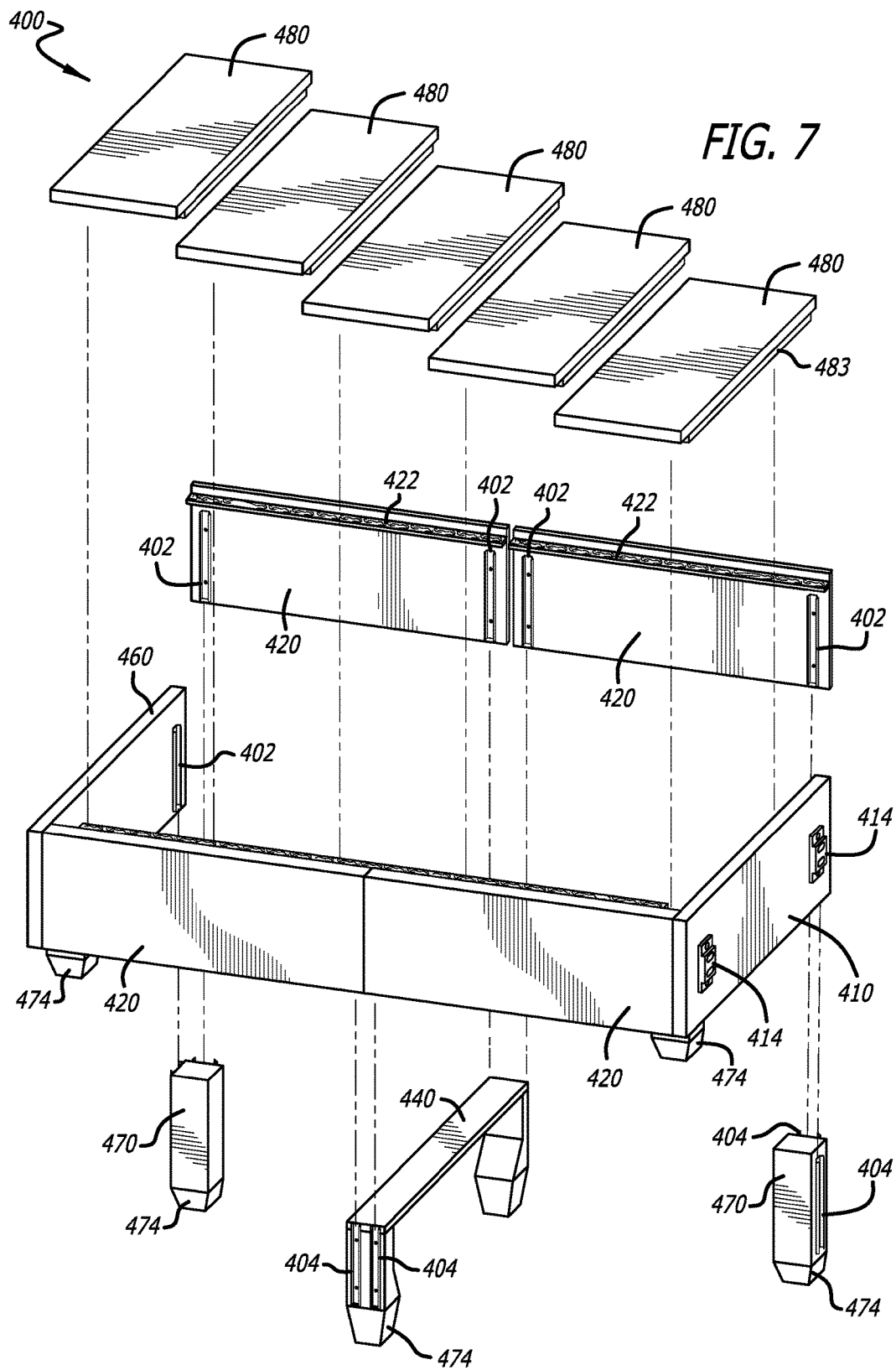
FIG. 7 is a partially exploded perspective view of the mattress foundation.

Once the individual side panel subassemblies 420, crossmember assembly 440, headboard end panel assembly 410 and footboard end panel assembly 460 have been attached in the foregoing manner, and the legs/gliders 474 have been screwed into the respective threaded female openings 441 and 471, the foundation 400 is completed by simply laying the top panels 480 laterally across the foundation 400, so that each extends between the two (left and right) side panel assemblies. For this purpose, the top surface 423 of each ledge 422 preferably is provided with a high-density hook or loop material (e.g., commonly sold under the trademark Velcro), and a strip of mating high-density loop or hook material 482 is provided on the bottom surface of each end (i.e., each short side) of top panel 481 (e.g., as shown in FIG. 6), in order to help maintain each such top panel 480 in position. Alternatively, or in addition, other means for securely attaching the top panel assemblies 480 (such as snap-fit mechanisms, magnets or temporary adhesive) may be used, or such a securing means may be omitted entirely. As also shown in FIG. 6, each long side edge of each top panel 481 preferably is provided with a rail 483 (e.g., glued and/or nailed on, also made of wood, and having a square or rectangular cross-section) for reinforcement. Alternatively, as described in the priority applications, similar rails can be provided as separate components (e.g., unattached to the top panel assemblies 480). FIG. 7 illustrates the various components of foundation 400 and how they attach to each other. The discussion below provides additional detail in this regard, as well as certain variations on the structures discussed above.

Figure 8:
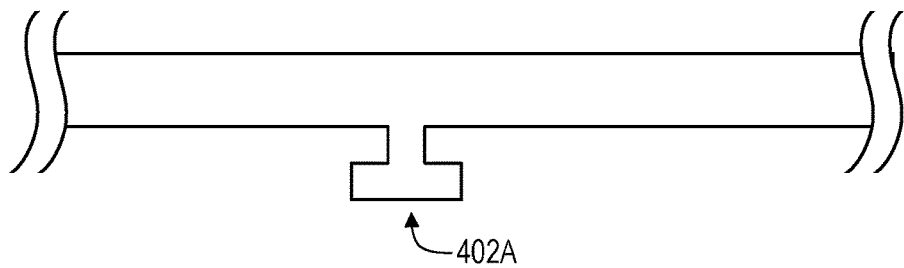
FIG. 8 is a top cross-sectional view of a first embodiment of a component having an elongated tab which functions as one side of a sliding mechanism.
Figure 9:
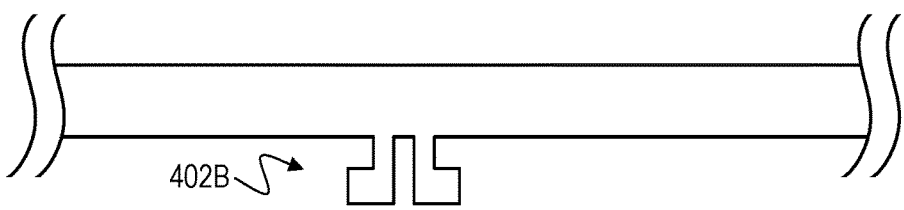
FIG. 9 is top cross-sectional view of a second embodiment of a component having an elongated tab which functions as one side of a sliding mechanism.

In the preferred embodiments, as noted above and discussed in greater detail below, the principal mounting hardware for a foundation according to the present invention is a first sliding mechanism that mates with a compatible second sliding mechanism on another component to which the first subject component attaches. That is, in the preferred embodiments, the major components of foundation 400 (e.g., end panel assemblies 410 and 460, corner pieces 470, side panel subassemblies 420 and crossmember assembly 440) simply slide together. For this purpose, in the current embodiment, each of the headboard end panel assembly 410, the plurality of side panel subassemblies 420, and the footboard end panel assembly 460 is provided with a first type of sliding assembly, while each of the crossmember assembly 440 and the plurality of corner pieces 470 is provided with a second type of sliding assembly which mates with the first type. The first type, sliding assembly 402 can be implemented, e.g., as sliding assembly 402, already discussed above and shown in FIG. 2, as sliding assembly 402A, shown in FIG. 8, sliding assembly 402B, shown in FIG. 9, or sliding assembly 402C, shown in FIG. 12 and includes an elongated protruding element or tab has a narrower proximal section, where it extends from the subject component, and terminates in a wider distal section.

Figure 10:
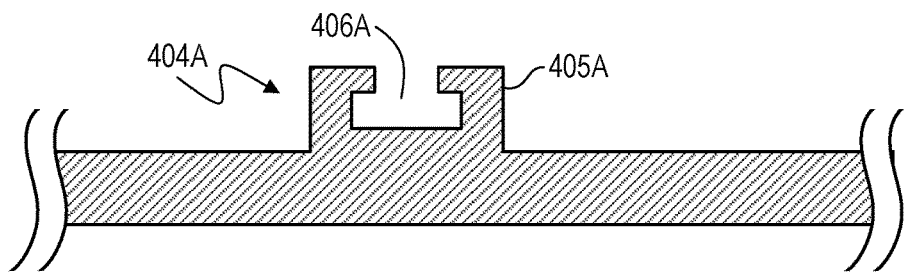
FIG. 10 is a top cross-sectional view of a component having an elongated slot which functions as the other side of a sliding mechanism.
Figure 11:
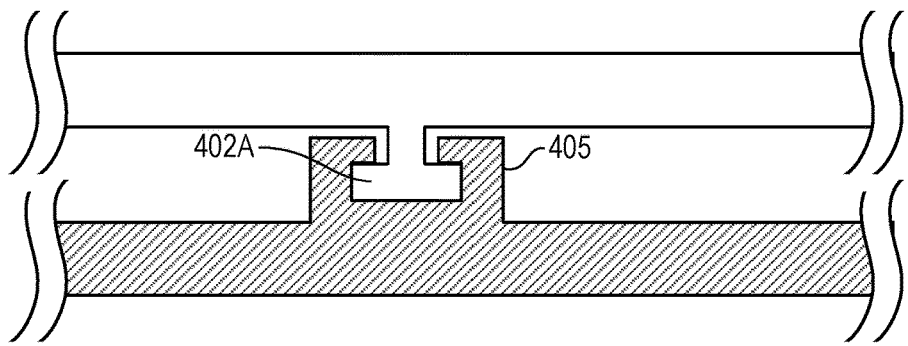
FIG. 11 is a top cross-sectional view of an elongated tab and an elongated slot, as engaged with each other.

In the current embodiment, the second type, sliding assembly 404 (e.g., sliding assembly 404, as shown in FIGS. 2 and 3, sliding assembly 404A, defining an elongated slot 406A as shown in FIG. 10, or sliding assembly 404B defining an elongated slot 406B, as shown in FIG. 13), includes a partial wraparound structure 405 (e.g., the wraparound structure, as shown in FIGS. 2 and 3, wraparound structure 405A, as shown in FIG. 10, or wraparound structure 405B, as shown in FIG. 13) that defines an elongated slot 406 (e.g., slot 406, as shown in FIGS. 2 and 3, slot 406A, as shown in FIG. 10, or slot 406B, as shown in FIG. 13), which has a narrower opening along its length and is wider in its interior portion. As a result, the wider distal end of the elongated protruding tab 402 can simply be slid into the elongated slot 406, e.g., by inserting the bottom end of protruding tab 402 into the top end of elongated slot 406, e.g., with the result shown in FIG. 11, thereby joining the two components together. As will be readily appreciated, such a configuration fixedly joins the two components together, other than potential up or down movements relative to one another, which potential linear motion can be addressed, e.g., in any of the ways discussed below. Because the longitudinal opening to slot 406 is narrower than the wider distal end 403 of the elongated protruding tab 402, the two components cannot be simply pulled apart. Instead, if one wished to separate them, they would have to be slid apart.

It is noted that other structures and mechanisms for allowing two components to slide together (e.g., in the foregoing manner) instead may be used. For instance, rather than attaching a separate sliding bracket to the subject components, the components themselves may be formed with such tabs or slots/grooves (e.g., integral with their structures, such as by molding them to have such features or cutting such features into them). Also, any of these sliding mechanism structures described in the priority applications instead (or in addition) may be used. Finally, except to the extent expressly and specifically stated otherwise, it is noted that any references herein to two components slidably engaging with each other can encompass direct engagement with each other (e.g., with the corresponding sliding mechanisms directly attached to or otherwise incorporated within such components) or in direct engagement with each other (e.g., with either or both of such components slidably engaging with a third component which is attached to or can attach to the other component).

The decision as to which components will include the slot feature and which will include the tab or protruding-element feature can be made to achieve other desired goals. For instance, the selection and placement in the current (preferred) embodiment reduces the number of different types of components that must be produced. A similar result could be achieved by reversing the assignment, with each of the crossmember assembly 440 and the plurality of corner pieces 470 being provided with the first type of sliding assembly discussed above, and each of the headboard end panel assembly 410, the plurality of side panel subassemblies 420, and the footboard end panel assembly 460 being provided with the second type of siding assembly discussed above.

Two different locking or holding mechanisms preferably also are incorporated into the mating/sliding assemblies in the current embodiment. First, while the elongated tab or protruding element 402 has a uniform width along its entire length, e.g., as shown in FIG. 15, the elongated slot 406 is tapered toward the bottom, e.g., as shown in FIG. 16. As a result, a friction fit is achieved as tab 402 is slid down into slot 406 (as shown in FIG. 17), thereby making it less likely that the two components will accidentally separate from each other. In addition, at the bottom of slot 406 is a stop 407, which: (1) prevents tab 402 from being inserted too far (i.e., beyond stop 407), (2) helps to ensure that all the components will be level relative to each other (assuming all tabs are fully inserted), and (3) lets the user know when the tab 402 has been fully inserted. However, in alternate embodiments, either or both of stop 407 and/or the narrowing of slot 406 is omitted.

Also, other locking and/or holding mechanisms may be employed in addition to or instead of the foregoing. For instance, the elongated protruding tab or other element 402 could also (or instead) be tapered. In the preferred embodiments, however, at least one of the protruding element 402 or the slot 406 is tapered in order to provide the desired wedge fit. For this purpose, at least one of such components also has a horizontal cross-section that includes thin flexible arms (e.g., wraparound structure 405, as shown in FIGS. 2 and 3, wraparound structure 405A, as shown in FIG. 10, wraparound structure 405B, as shown in FIG. 13, pair of elements 402, shown in FIG. 2, or pair of elements 402C, shown in FIG. 12) for enhancing the friction fit. To further enhance this effect, in the embodiment shown in FIGS. 2 and 3, each of the protruding element 402 and the slot 406 has a horizontal cross-section that includes thin flexible arms.

Other means can also be employed for helping the two components remain engaged. For instance, in addition to, or instead of, such a tapering feature, the combination of a dimple in one component and a hole in the other would help hold the two together, when the dimple engages with the hole. Alternatively, a dimple could be used without a corresponding hole, thereby providing added friction. Still further, pin-and-hole combinations could be used, either with a manually inserted pin or a spring-loaded (e.g., manually retractable) pin.

In the current specific embodiment, each end of the inner surface of each side panel subassembly 420 (e.g., as shown in FIGS. 5 and 18), as well as the headboard end panel assembly 410 and the footboard end panel assembly 460 (which, as shown in FIG. 20, are identical in the current embodiment) is provided with a sliding assembly 402. Also, in this embodiment each of two adjacent sides of each corner piece 470 is provided with a sliding assembly 404 (e.g., as shown in FIGS. 2, 3 and 21), and each side edge of the crossmember assembly 440 (as shown in FIGS. 4 and 22) is provided with two parallel sliding assemblies 404, one at the front edge and one at the rear edge.

As a result of this configuration, a side panel subassembly 420 can be attached to one side of a corner piece 470 and the headboard end panel assembly 410 or the footboard end panel assembly 460 can be attached to the adjacent side of the same corner piece 470, thereby joining the two components together. In addition, along each side, two side panel subassemblies 420 can be attached, end to end to each other and also to the end surface of the crossmember assembly 440, by simply slidably attaching the sliding assembly 402 at the proximal end of each of the two side panel subassemblies 420 to one of the two parallel sliding assemblies 404 along one end of the crossmember assembly 440. The resulting configuration is shown, e.g., in FIG. 25.

Although only a single crossmember assembly 440 is used in the current embodiment, two or more crossmember assemblies 440 can be used in parallel to attach a corresponding three or more side panel subassemblies 420 end to end, e.g., depending upon the desired length of the foundation 400 and the desired length of each side panel subassembly 420 or, alternatively, depending upon the desired number of crossmember assemblies 440. Preferably, the gap, if any, between adjacent end-to-end side panel subassemblies 420 is small, such as less than 1 inch and, more preferably, less than ½ inch, ¼ inch or even ⅛ inch.

As shown in FIGS. 18 and 19 and noted above, in the current embodiment, each side panel subassembly 420 also has an inwardly extending relatively narrow ledge 422 on its inner surface, extending its entire length, parallel to its top edge and located a little bit below its top edge, e.g., so that the top surface of ledge 422 is not greater than 2 inches, 1 inch or ½ inch below the top edge of such side panel subassembly 420. In the completed foundation 400, the top surface of ledge 422 is provided with high-density hook or loop material (e.g., commonly sold under the name Velcro™) and serves as a surface for supporting the one of the ends of the top panels 480. In the current embodiment, the distance between the top surface 423 of ledge 422 and the top edge of such side panel subassembly 420 is approximately the same as the thickness of the top panels 480 that are used, so that in the completed foundation 400, the top edges of the side panel subassemblies 420 and the top surfaces of the top panels 480 are approximately coplanar. However, in alternate embodiments, the top surfaces of the top panels 480 are below the top edges of the side panel subassemblies 420 in the completed foundation 400, so that the mattress that is used fits inside and is thereby inhibited from moving relative to the top panels 480.

From the top of each leg 475 extends a threaded male member 476, so that the leg 475 can be screwed into a corresponding threaded female opening 471, which is provided in the bottom of each of the corner pieces 470, or into a corresponding threaded female opening 441, which is provided in the bottom surface at each end of the crossmember assembly 440. Also, in the current embodiment, each leg 474 has a tapered cross-section (narrower at the bottom than at the top, with the top dimensions matching the cross-section of the corner pieces 470). However, in alternate embodiments, each leg 475 instead has a square or rectangular cross-section that matches the cross-section of the corner pieces 470. However, in other embodiments, legs are used having a different cross-section (e.g., circular or otherwise rounded) and/or different sizes than the corner pieces 470 to which they attach. Also, in alternate embodiments, the legs (e.g., legs 474 or 475) are attached at other locations, to other components (e.g., to the headboard end panel assembly 410 and/or the footboard end panel assembly 460) and/or in other ways (e.g., using a snap-fit mechanism). Still further, in certain embodiments, the legs (e.g., legs 474 or 475) are permanently attached to or integrally formed with the main components. However, for flexibility in use of the resulting foundation 400, as well as for ease of storage and shipment, it is generally preferable for the legs (e.g., legs 474 or 475) to be easily attachable/detachable. As to the former consideration, by omitting to attach the legs (e.g., legs 474 or 475), the resulting foundation 400 can be used in the same manner as a conventional box spring, within an existing bed frame, or as a standalone foundation without legs (thereby eliminating the space underneath the foundation 400), while attaching the legs (e.g., legs 474 or 475) allows foundation 400 to be used as a more traditional bed frame. Other benefits of detachable legs (e.g., legs 474 or 475) is that the user can select from different styles of legs (e.g., rounded or rectangular, parallel edges or tapered) and simply attach the desired kind, or can even attach casters (e.g., wheels) or other components for elevating the frame 400 above the floor, instead of plain legs or gliders.

In the preferred embodiments, although not generally shown in the drawings in order to better illustrate the functional structure of the preferred embodiment, the visible surfaces of the foundation 400 are covered in cloth or otherwise finished in order to accommodate the variety of uses described in the preceding paragraph. With such cloth covering or other finishing, even when foundation 400 is used as a box spring within an existing frame, a benefit is obtained, i.e., the ability to avoid using a separate dust ruffle while still maintaining an aesthetically pleasing appearance. Such a cloth covering, if used, can be made to conform exactly to the surfaces of the subject components. Alternatively, some or all the components may be covered in a manner so as to hide certain structural features, e.g., depending upon costs of manufacture and/or aesthetic considerations. For instance, either or both of the crossmember assembly 440 and/or the corner pieces 470 might be covered to appear as a simple rectangular prism. Although not typically shown in the drawings, the outer surfaces of the headboard end panel assembly 410 and/or the footboard end panel assembly 460 also can be provided with brackets (e.g., brackets 414) for attaching a headboard or a footboard, respectively.

Figure 27:
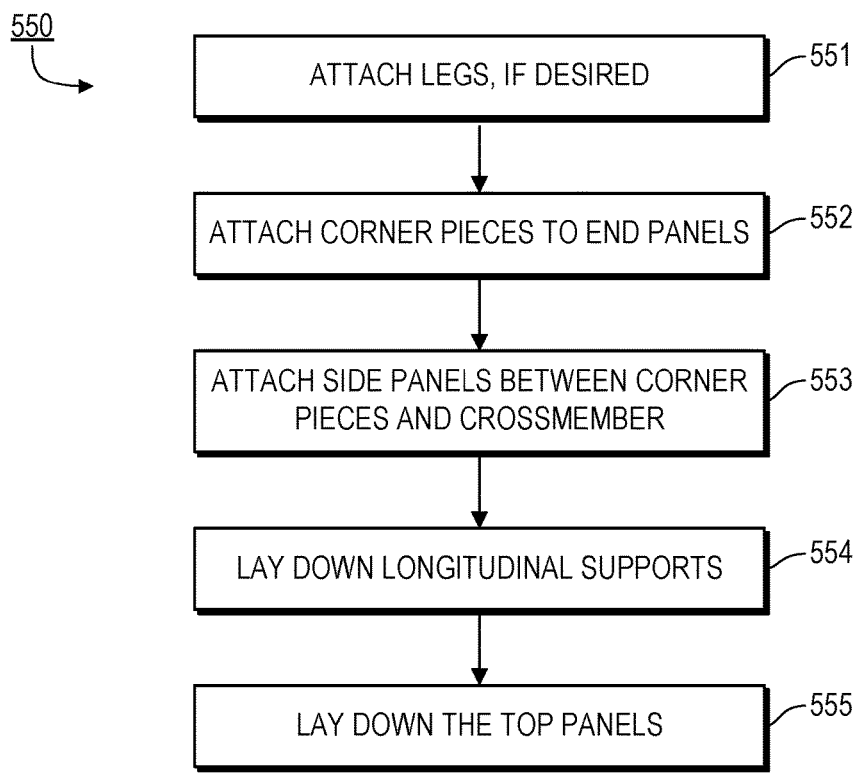
FIG. 27 is a flow diagram illustrating a process for assembling the foundation.

A method 550 for assembling foundation 400 is now described primarily in reference to FIG. 27. Initially, in step 551 a leg 474 (or 475) is attached to each of the four corner pieces 470 and to each end of crossmember assembly 440. In the current embodiment, the threaded male member 476 of each such leg 474 (or 475) is screwed into a corresponding female threaded opening 471 or 441, respectively. However, as noted above, this step 551 can be omitted, or a different component (such as a caster) instead may be attached in this step 551, depending upon the intended use and/or configuration of the completed foundation 400.

In step 552, a corner piece 470 is slid onto each end of the headboard end panel assembly 410 and the footboard end panel assembly 460, using the sliding assembly 402 at the end of the corresponding end panel assembly and one of the sliding assemblies 404 on the corresponding corner piece 470, such that the outer side of each corner piece 470 has an exposed (currently unused) sliding assembly 404. That is, in each case, the bottom edge of the sliding assembly 402 is inserted into the top edge of the sliding assembly 404, and the two are slid together until stop 407 is encountered.

Figure 25:
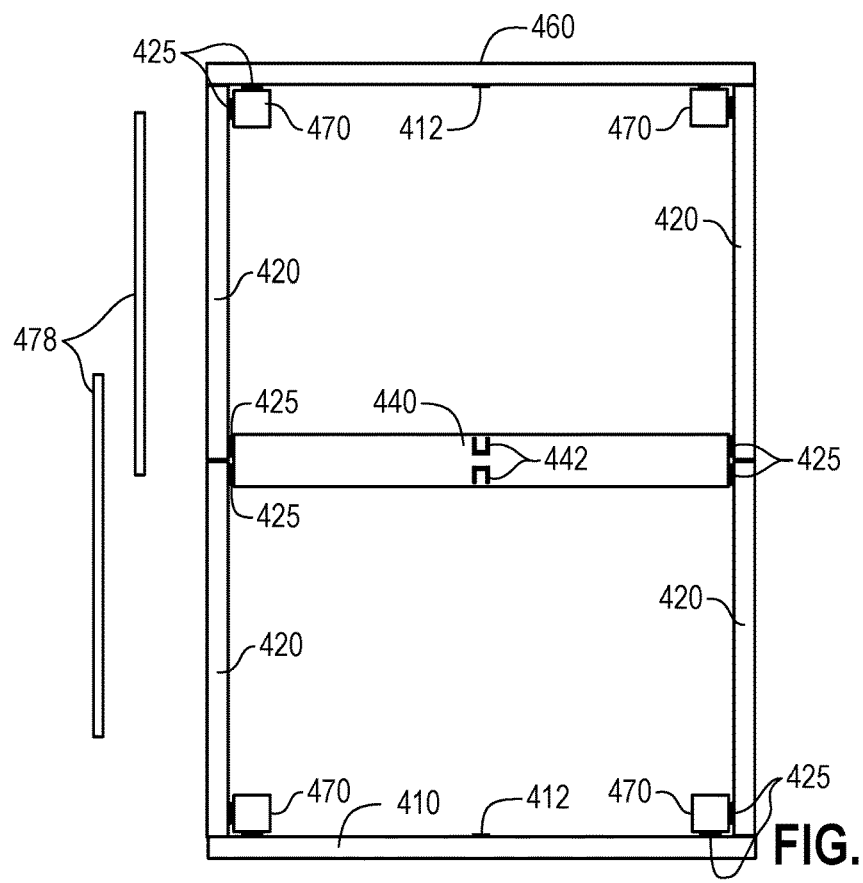
FIG. 25 is a top plan view of the completed foundation, other than the top panels, with the longitudinal supports set to the side, and with the inwardly extending edges on the side panel assemblies omitted in order to show other details of the construction.

In step 553, the sliding assembly 402 on one end of a side panel subassembly 420 is slid down onto the exposed sliding assembly 404 of one of the corner pieces 470, and the sliding assembly 402 on other end is slid down onto a sliding assembly 404 on the crossmember assembly 440 until stop 407 is encountered. This step is repeated for each of the four side panel subassemblies 420, so that the distal end of each side panel subassembly 420 attaches to an end panel (i.e., either headboard end panel assembly 410 or footboard end panel assembly 460), while its proximal end attaches to the crossmember assembly 440, and so that on each lateral side of the partially completed foundation 400, two side panel subassemblies 420 are arranged end-to-end to form a side panel assembly. The result of this step 553 is shown in FIG. 25, except that to better show the locations 425 at which the components are slidably attached to each other (using sliding assemblies 402 and 404), the ledges 422 are omitted from FIG. 25.

Figure 26:
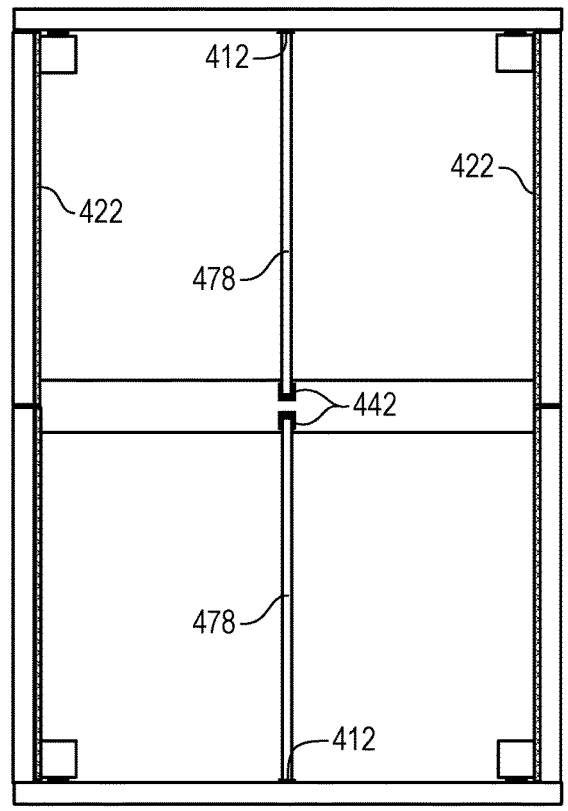
FIG. 26 is a top plan view of the completed foundation, other than the top panels.

Next, in certain alternate embodiments, in step 554 longitudinal supports 478 are laid down. For this purpose, a bracket 412 can be provided on the inner surface of each of the headboard end panel assembly 410 and the footboard end panel assembly 460 (as shown in FIG. 20), and a pair of brackets 442 (e.g., as shown in FIGS. 22 and 25, or just a single bracket that accommodates both longitudinal supports 478) can be provided on the top surface of crossmember assembly 440. In the current embodiment, each such longitudinal support 478 is laid between one of the brackets 412 and one of the brackets 442. The result of this step 554 is shown in FIG. 26.

Finally, in step 555 the top panels 480 are simply laid laterally across the top of the partially completed foundation 400, extending between the ledges 422 on opposite side panel subassemblies 420. In the current embodiment, five such top panels 480 are used, with the middle one overlying and supported by the crossmember assembly 440. Also, in the current embodiment the top panels 480 have strips of high-density hook or loop material (commonly sold under the brand name Velcro™) 482 on the bottom surface of its outer (shorter) ends, as shown in FIGS. 6 and 24, and the top surfaces 423 of the ledges 422 are covered with the mating high-density loop or hook material, in order to help secure top panels 480. However, in other embodiments such material is omitted, or other means (e.g., pins, magnets or snap-fit tabs and corresponding openings) are used to secure top panels 480 in place. In any event, the solid surface provided by panels 480 is particularly advantageous, allowing foundation 400 to be used, e.g., with a foam mattress.

As will be readily appreciated, the assembly method 550 involves just four or five simple steps that do not require any tools or separate hardware and can be performed in a matter of minutes. The process for disassembly (e.g., in order to store or transport the foundation 400) is simply the reverse of method 550, described above. Also, the steps of method 550 can be rearranged in different orders, as desired.

One significant advantage of foundation 400 is that it can be assembled from a very small number of different components. For example, in the current embodiment, the headboard end panel assembly 410 and the footboard end panel assembly 460 are identical to each other. Similarly, all of the side panel subassemblies 420 are identical to each other, all of the corner pieces 470 are identical to each other, all of the legs 474 (or 475) are identical to each other, and all of the top panel assemblies 480 are identical to each other, meaning that the foundation 400 can be assembled from two end panel assemblies (410 and 460), four side panel subassemblies 420, four corner pieces 470, six legs 474 (or 475), a single crossmember assembly 440, and five top panel assemblies 480. Still further, by appropriately sizing the foregoing components, different foundation sizes (e.g., twin, twin XL, full, Queen, King and California King) can be assembled using different numbers of such components from a common set of such components, thereby significantly reducing manufacturing costs. In some cases, especially for the larger sizes, one or two additional or different components may be used.

Figure 28:
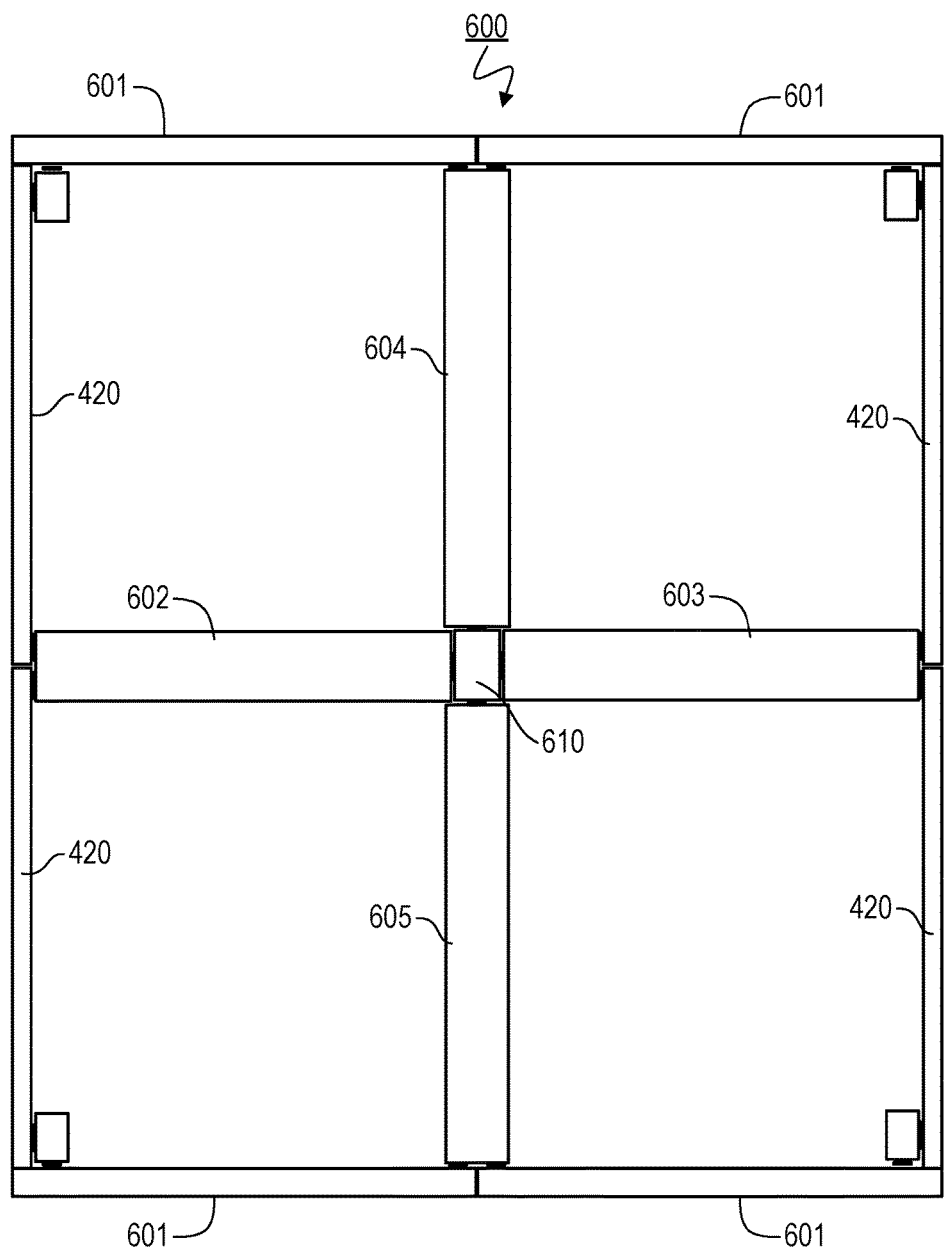
FIG. 28 is a top plan view of a completed foundation, other than top panels and ledges, according to an alternate variation.

For instance, FIG. 28 illustrates a larger foundation 600 (e.g., King or California King size), other than the top panels 480 or the ledges 422, in order to better illustrate the various components and how they are attached to each other. Although the foundation 600 is larger, it is still desirable to keep the individual components relatively small, e.g., not greater than 48 inches in length and, more preferably, not greater than 45 or 42 inches in length, so that all of the components can fit into a box that will not overhang a standard-sized pallet. As a result, rather than using a single panel, each of the head and foot of the foundation 600 is made up of two end panel assemblies 601. Preferably, each such end panel assembly 601 is identical to the end panel assembly 410 or 460 (discussed above), other than overall length (which may be different depending upon the desired width of the resulting foundation 600) and the fact that if brackets 114 are provided for attaching a headboard and/or a footboard, each such end panel assembly 601 includes just one (at its outer end). It is noted that in the current embodiment, it is assumed that end panel assembly 601 is symmetrical, so that the same component can be used at either position (albeit with adjacent and panel assemblies 601 rotated 180° relative to each other). If that is not the case, then two different components can be used.

Also, a wider foundation 600 often will require more longitudinal support than can be provided just by support beams 478 (discussed above). For this reason, in foundation 600 the lateral support is divided into two parts 602 and 603, and two similar supports 604 and 605 are included in order to provide longitudinal support. The outer end of each of these supports 602-605 preferably is identical to the outer ends of crossmember assembly 440, discussed above, e.g., including two parallel sliding assemblies 404 on its end surface for attaching two side or end panel assemblies end-to-end in the manner discussed above and including a female threaded opening in its bottom surface for attaching a leg 475 or other component (e.g., as discussed above). However, the inner ends of supports 602-605 can include just a single sliding mechanism (of either type) which attaches to a mating sliding mechanism on center hub 610, which has such a mating sliding mechanism on each of its four sides (and preferably also includes a female threaded opening in its bottom surface for attaching a leg 475 or other component, e.g., as discussed above). As a result of this configuration, rather than using a single long end panel assembly, two shorter end-to-end panels can be used at the head and foot of the foundation 600, in a similar manner to how the side panel subassemblies 420 are used in foundation 400, thereby keeping the overall length of each component beneath the maximums noted above. In alternate embodiments, e.g., where it is desirable to use crossmember assembly 440 within foundation 600 (and thereby avoid having to manufacture a different component), supports 602-605 are replaced by crossmember assembly 440, and a central hub with two parallel sliding mechanisms on each of its four surfaces instead is used. Other than as described in this paragraph, the other components of foundation 600 preferably are the same as the components of foundation 400 (discussed above).

Figure 29:
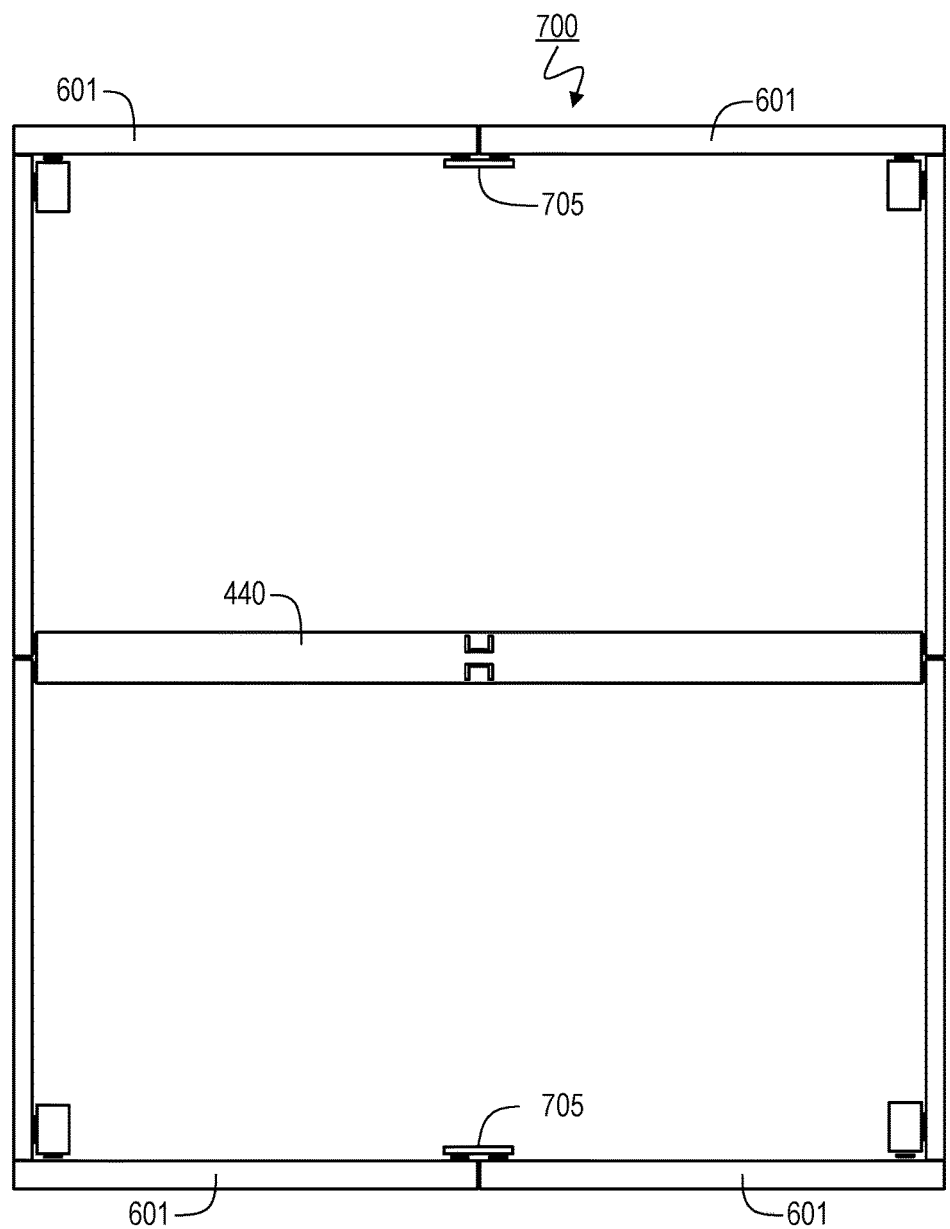
FIG. 29 is a top plan view of a completed foundation, other than top panels and ledges, according to still further variation.

Finally, FIG. 29 shows a foundation 700, which is similar to foundation 600 but can rely on longitudinal supports 478, rather than the stronger supports 604 and 605. Therefore, in this variation, foundation 700 includes two relatively narrow panels or plates 705, with each including two sliding mechanisms that engage with sliding mechanisms on adjacent end panel assemblies 601, thereby attaching such end panel assemblies 601 to each other in the same manner that supports 604 and 605 do in foundation 600. Alternatively, each of the components 705 can be made wider and can include a female threaded opening in its bottom surface to accommodate installation of a leg 475 or similar component (as discussed above). Also, because it is not necessary to include longitudinal supports 604 and 605 in this variation, a single crossmember assembly 440 can be used in this variation (although with a greater overall length than the crossmember assembly 440 used in foundation 400, discussed above). However, rather than using a single long crossmember assembly 440, crossmember assembly 440 instead can be comprised of two subassemblies that slide together, e.g., with each having two elongated protruding elements 402 at one end and two elongated sliding assemblies 404 (each defining a slot 406) at the other end, so that the two subassemblies can be simply slid together.

In the description above, headboard end panel assembly 410, side panel subassemblies 420, footboard end panel assembly 460 and corner pieces 470 generally are discussed as being separate components. However, it is noted that, unless clearly and expressly indicated to the contrary, an individual corner piece 470 might be considered to be part of a headboard end panel assembly 410, side panel subassembly 420 or footboard end panel assembly 460, when attached to it.

Additional Considerations.

As used herein, the term "attached", or any other form of the word, without further modification, is intended to mean directly attached, attached through one or more other intermediate elements or components, or integrally formed together. In the drawings and/or the discussion, where two individual components or elements are shown and/or discussed as being directly attached to each other, such attachments should be understood as being merely exemplary, and in alternate embodiments the attachment instead may include additional components or elements between such two components. Similarly, method steps discussed and/or claimed herein are not intended to be exclusive; rather, intermediate steps may be performed between any two steps expressly discussed or claimed herein.

Unless otherwise clearly stated herein, all relative directions (e.g., left, right, top, bottom, above, below) mentioned herein in relation to an article are from the perspective of the article itself and, therefore, are consistent across different views.

In the event of any conflict or inconsistency between the disclosure explicitly set forth herein or in the accompanying drawings, on the one hand, and any materials incorporated by reference herein, on the other, the present disclosure shall take precedence. In the event of any conflict or inconsistency between the disclosures of any applications or patents incorporated by reference herein, the disclosure most recently added or changed shall take precedence.

Unless clearly indicated to the contrary, words such as "optimal", "optimize", "maximize", "minimize", "best", as well as similar words and other words and suffixes denoting comparison, in the above discussion are not used in their absolute sense. Instead, such terms ordinarily are intended to be understood in light of any other potential constraints, such as user-specified constraints and objectives, as well as cost and processing or manufacturing constraints.

In the above discussion, certain methods are explained by breaking them down into steps listed in a particular order. However, it should be noted that in each such case, except to the extent clearly indicated to the contrary or mandated by practical considerations (such as where the results from one step are necessary to perform another), the indicated order is not critical but, instead, that the described steps can be reordered and/or two or more of such steps can be performed concurrently.

References herein to a "criterion", "multiple criteria", "condition", "conditions" or similar words which are intended to trigger, limit, filter or otherwise affect processing steps, other actions, the subjects of processing steps or actions, or any other activity or data, are intended to mean "one or more", irrespective of whether the singular or the plural form has been used. For instance, any criterion or condition can include any combination (e.g., Boolean combination) of actions, events and/or occurrences (i.e., a multi-part criterion or condition).

In the discussions above, the words "include", "includes", "including", and all other forms of the word should not be understood as limiting, but rather any specific items following such words should be understood as being merely exemplary.

Several different embodiments of the present invention are described above and in the documents incorporated by reference herein, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the intent and the scope of the invention. Accordingly, the invention is not limited to the precise embodiments shown in the drawings and described above. Rather, it is intended that all such variations not departing from the intent of the invention are to be considered as within the scope thereof as limited solely by the claims appended hereto.

What is claimed is:

1. A mattress foundation, comprising: a headboard end panel assembly having a first end and a second end; a footboard end panel assembly having a first end and a second end; a left side panel assembly having a first end and a second end; a right side panel assembly having a first end and a second end; and a top surface, disposed at a top edge of each of said headboard end panel assembly, said footboard end panel assembly, said left side panel assembly and said right side panel assembly, for supporting a mattress so as to prevent said mattress from sagging, wherein the first end of the left side panel assembly slidably engages with the first end of the headboard end panel assembly via a first sliding mechanism so as to form a first corner attachment, and the second end of the left side panel assembly slidably engages with the first end of the footboard end panel assembly via a second sliding mechanism so as to form a second corner attachment, wherein the first end of the right side panel assembly slidably engages with the second end of the headboard end panel assembly via a third sliding mechanism so as to form a third corner attachment, and the second end of the right side panel assembly slidably engages with the second end of the footboard end panel assembly via a fourth sliding mechanism so as to form a fourth corner attachment, wherein at least one of the first sliding mechanism, the second sliding mechanism, the third sliding mechanism, and the fourth sliding mechanism includes an elongated slot and an elongated protruding element that fits within said elongated slot, and wherein a horizontal cross-section of at least one of said elongated slot and said elongated protruding element includes thin elongated flexible arms, attached at their proximal ends to a common surface, but otherwise extending away from said common surface and separated from each other, for enhancing a friction fit, and wherein when viewed from said horizontal cross-section, an average thickness of said thin elongated flexible arms is substantially less than a length of said thin elongated flexible arms.

2. A mattress foundation according to claim 1, wherein when the first end of the left side panel assembly slidably engages with the first end of the headboard end panel assembly, a left side panel that forms a main structure of the left side panel assembly is approximately perpendicular to a headboard panel that forms a main structure of the headboard end panel assembly.

3. A mattress foundation according to claim 1, wherein at least one of said elongated slot and said elongated protruding element is tapered in width as a function of vertical position, thereby providing the friction fit when said first component and said second component are slidably engaged with each other.

4. A mattress foundation according to claim 1, wherein the elongated protruding element has a narrower proximal portion and a wider distal portion, and the elongated slot has a wider proximal section for accommodating the wider distal portion of the elongated protruding element and has a narrower distal portion for accommodating the narrower proximal portion of the elongated protruding element.

5. A mattress foundation according to claim 1, further comprising a stop to prevent said elongated protruding element from sliding too far into said elongated slot.

6. A mattress foundation according to claim 1, wherein the first end of the left side panel assembly slidably engages with the first end of the headboard end panel assembly via a first corner piece that attaches to an inside surface of each of the left side panel assembly and the headboard end panel assembly, and the second end of the left side panel assembly slidably engages with the first end of the footboard end panel assembly via a second corner piece that attaches to an inside surface of each of the left side panel assembly and the footboard end panel assembly.

7. A mattress foundation according to claim 6, wherein the first corner piece slidably attaches to the inside surface of each of the left side panel assembly and the headboard end panel assembly, and the second corner piece slidably attaches to the inside surface of each of the left side panel assembly and the footboard end panel assembly.

8. A mattress foundation according to claim 1, wherein each of the left side panel assembly and the right side panel assembly comprises two elongated side panels that are attached together at their proximal ends.

9. A mattress foundation according to claim 8, wherein, for each of the left side panel assembly and the right side panel assembly, said two elongated side panels are slidably attached to each other.

10. A mattress foundation according to claim 9, wherein, for each of the left side panel assembly and the right side panel assembly, said two elongated side panels are slidably attached to each other via an intermediate component that is slidably attached to each of said two elongated side panels.

11. A mattress foundation according to claim 10, wherein said intermediate component is a crossmember assembly having: (a) a first end surface that slidably attaches to an inner surface of each of the two side panels of the left side panel assembly and (b) a second end surface that slidably attaches to an inner surface of each of the two side panels of the right side panel assembly.

12. A mattress foundation according to claim 11, wherein the crossmember assembly has a bottom surface that includes: (a) a first female threaded opening near the first end surface and (b) a second female threaded opening near the second end surface.

13. A mattress foundation according to claim 12, further comprising two elevating components, each comprised of (a) at least one of a foot, a leg or a glider for elevating said mattress foundation, and (b) a male threaded post, with the male threaded post for one of said two elevating components screwed into each of the first female threaded opening and the second female threaded opening.

14. A mattress foundation according to claim 1, wherein each of the headboard end panel assembly and the footboard end panel assembly comprises two panels that are attached together at their proximal ends.

15. A mattress foundation according to claim 14, wherein, for each of the headboard end panel assembly and the footboard end panel assembly, said two panels slidably attach to each other via an intermediate component that slidably attaches to an inner surface of each of said two panels.

16. A mattress foundation according to claim 1, wherein each of said headboard end panel assembly, said footboard end panel assembly, said left side panel assembly and said right side panel assembly primarily is comprised of at least one of wood, a polymer or a composite material.

17. A mattress, comprising:
a headboard end panel assembly having a first end and a second end;
a footboard end panel assembly having a first end and a second end;
a left side panel assembly having a first end and a second end; and
a right side panel assembly having a first end and a second end,
wherein the first end of the left side panel assembly slidably engages with the first end of the headboard end panel assembly so as to form a first corner attachment, and the second end of the left side panel assembly slidably engages with the first end of the footboard end panel assembly so as to form a second corner attachment,
wherein the first end of the right side panel assembly slidably engages with the second end of the headboard end panel assembly so as to form a third corner attachment, and the second end of the right side panel assembly slidably engages with the second end of the footboard end panel assembly so as to form a fourth corner attachment,
wherein the first end of the left side panel assembly slidably engages with the first end of the headboard end panel assembly via a first corner piece that attaches to an inside surface of each of the left side panel assembly and the headboard end panel assembly, and the second end of the left side panel assembly slidably engages with the first end of the footboard end panel assembly via a second corner piece that attaches to an inside surface of each of the left side panel assembly and the footboard end panel assembly, and
wherein each of the first corner piece and the second corner piece is configured for attaching at least one of a foot, a leg or a glider for elevating said mattress foundation.

18. A mattress foundation, comprising:
a headboard end panel assembly having a first end and a second end;
a footboard end panel assembly having a first end and a second end;
a left side panel assembly having a first end and a second end;
a right side panel assembly having a first end and a second end; and
a plurality of top panels, each extending laterally from a top edge of the left side panel assembly to a top edge of the right side panel assembly, and together forming a top surface for said mattress foundation,
wherein the first end of the left side panel assembly slidably engages with the first end of the headboard end panel assembly so as to form a first corner attachment, and the second end of the left side panel assembly slidably engages with the first end of the footboard end panel assembly so as to form a second corner attachment,
wherein the first end of the right side panel assembly slidably engages with the second end of the headboard end panel assembly so as to form a third corner attachment, and the second end of the right side panel assembly slidably engages with the second end of the footboard end panel assembly so as to form a fourth corner attachment,
wherein the first end of the left side panel assembly slidably engages with the first end of the headboard end panel assembly via a first corner piece that attaches to an inside surface of each of the left side panel assembly and the headboard end panel assembly, and the second end of the left side panel assembly slidably engages with the first end of the footboard end panel assembly via a second corner piece that attaches to an inside surface of each of the left side panel assembly and the footboard end panel assembly, and
wherein at least one of said top panels has a pair of rails attached to its bottom surface and extending along its length, for a substantial portion of its length between the left side panel assembly and the right side panel assembly, for reinforcement.

19. A mattress foundation according to claim 18, wherein each of said left side panel assembly and said right side panel assembly includes a ledge at a distance below its top edge that is approximately equal to a thickness of each of said top panels.

20. A mattress foundation according to claim 19, wherein the top surface of each said ledge is provided with a first type of high-density hook-or-loop material, and a corresponding strip on a bottom surface of the top panels is provided with a second, mating type of high-density loop-or-hook material.

* * * * *